United States Patent [19]
Sinnhuber

[11] Patent Number: 5,277,441
[45] Date of Patent: Jan. 11, 1994

[54] AIRBAG-EQUIPPED SIDE RESTRAINT FOR A MOTOR VEHICLE PASSENGER

[75] Inventor: Ruprecht Sinnhuber, Gifhorn, Fed. Rep. of Germany

[73] Assignee: Volkswagen AG, Wolfsburg, Fed. Rep. of Germany

[21] Appl. No.: 840,013

[22] Filed: Feb. 24, 1992

[30] Foreign Application Priority Data

Feb. 25, 1991 [DE] Fed. Rep. of Germany ....... 4105818

[51] Int. Cl.[5] ............................................. B60R 21/22
[52] U.S. Cl. ................................ 280/730 R; 280/735; 297/216.1
[58] Field of Search .... 280/728 R, 730 R, 735 R; 735 A 297/216

[56] References Cited

U.S. PATENT DOCUMENTS

| 2,834,606 | 5/1958 | Bertrand . | |
|---|---|---|---|
| 3,795,412 | 3/1974 | John . | |
| 3,865,398 | 2/1975 | Woll | 280/733 |
| 4,227,717 | 10/1980 | Bouvier | 280/730 A |
| 5,033,236 | 7/1991 | Szerdahelyi et al. | 280/730 X |
| 5,149,165 | 9/1992 | Woolley | 296/68.1 |

FOREIGN PATENT DOCUMENTS

| 0305655 | 3/1989 | European Pat. Off. . | |
|---|---|---|---|
| 2212190 | 9/1973 | Fed. Rep. of Germany . | |
| 3422263 | 2/1988 | Fed. Rep. of Germany . | |
| 3716168 | 11/1988 | Fed. Rep. of Germany . | |
| 4207253 | 9/1992 | Fed. Rep. of Germany | 280/731 |
| 3-281455 | 12/1991 | Japan | 280/728 |
| 3-281459 | 12/1991 | Japan | 280/730 |
| 4-46837 | 2/1992 | Japan | 280/728 |
| 1441598 | 7/1976 | United Kingdom . | |
| 2220620 | 1/1990 | United Kingdom | 280/730 A |
| 2225660 | 6/1990 | United Kingdom | 280/735 |

Primary Examiner—David M. Mitchell
Assistant Examiner—Gary C. Hoge
Attorney, Agent, or Firm—Brumbaugh, Graves, Donohue & Raymond

[57] ABSTRACT

A side restraint for a motor vehicle passenger contains at least one airbag positioned above an associated gas generator which is located at or below the level of the passenger's seat.

7 Claims, 3 Drawing Sheets

AIRBAG-EQUIPPED SIDE RESTRAINT FOR A MOTOR VEHICLE PASSENGER

BACKGROUND OF THE INVENTION

This invention relates to airbag restraints for motor vehicle passengers and, more particularly, to an airbag-equipped side restraint for a motor vehicle passenger.

In general, it has been possible to design existing vehicle parts as deforming elements or to provide additional deforming elements for converting kinetic energy into deformation work in the longitudinal direction of a motor vehicle. The deformation path available in case of a broadside collision is known to be very limited. In the case of a side restraint for a motor vehicle passenger, therefore, the side-restraining device must be designed so that it has a transverse dimension sufficient for effective cushioning only when needed, i.e., in a broadside collision. U.S. Pat. No. 2,834,606 describes a side restraint which includes an airbag mounted in the region of a roof girder which, after being actuated by the driver in an impending accident, extends downwardly between a passenger and the sidewall of the vehicle. This side restraint does not result in passenger inconvenience with respect to room for movement during normal travel but, in case of an accident, the restraint extends like an air cushion between a passenger and the imperiled sidewall. In this known construction, however, too much time is required for the airbag to reach its working position after it is released because of the distance between the location of the stored airbag, i.e., in the region of a roof girder, and the pelvis-shoulder region of the passenger which is to be protected.

In addition, difficulties arise because the airbag must expand in the transverse direction of the vehicle but, after expansion, it may not be able to move into the space between the passenger's shoulder and the sidewall, which may be quite narrow.

These same disadvantages are exhibited by the protective device disclosed in U.S. Pat. No. 3,795,412 which forms a cage for the passenger suspended from the roof of the vehicle. In case of an accident, this cage is supposed to be extended downwardly to surround the passenger, including his seat, on all sides. For this purpose, the cage has inflatable hoses, aligned vertically and a web which extends between the inflatable hoses.

It is likewise known, as described in German Patent No. 34 22 263, to provide a reservoir, filled with a gaseous medium and mounted in a girder of a vehicle, which is connected through a valved line to an inflatable envelope extending along the roof frame. If the girder is deformed, causing a pressure increase in the reservoir, the envelope is inflated and then forms a head restraint for a passenger sitting next to this part of the roof frame. Aside from the fact that the length of the connecting line would probably cause difficulties with regard to rapid activation of the inflatable envelope, this device constitutes only a head restraint so that the passenger's body is left unprotected to deformations of the sidewalls, including the side door.

It should be noted at this point that, although release of the side restraint in the device described in the above-mentioned U.S. Pat. No. 2,834,606 is effected by driver actuation of a switch or the like, the prior art, such as German Offenlegungsschrift No. 2 212 190, also discloses automatic collision sensors which are arranged as strips extending about the vehicle. Other collision sensors work capacitively by detecting accident-caused deformation of an outer member of the sidewall such as described in European Patent No. 0 305 655 or by detecting the variation in distance between two deformation signal elements designed as light guides as disclosed in German Offenlegungsschrift No. 37 16 168.

SUMMARY OF THE INVENTION

Accordingly, it is an object of the present invention to provide an airbag-equipped side restraint for a motor vehicle passenger which overcomes the disadvantages of the prior art.

Another object of the invention is to provide an airbag-equipped side restraint which, on the one hand, requires practically no additional space in the vehicle in its deactivated state, but, on the other hand, is rapidly activated in the event of a broadside collision.

These and other objects of the invention are attained by providing an airbag-equipped side restraint for a motor vehicle with a support having a gas generator and a collision sensor and an airbag which moves upwardly from the support.

Accordingly, in the deactivated state, the airbag may be arranged approximately at the level of the pelvis-shoulder region of the passenger to be protected, while the gas generator associated with it is mounted in a body girder at the level of the passenger's seat or slightly beneath it. This feature assures that, in case of an accident, the airbag can assume its inflated shape rapidly, without first having to travel a relatively long distance to the space between the passenger and the sidewall, as in the prior art discussed above. In addition, the body girder, which extends lengthwise in the vehicle body and supports the gas generator, need not be provided solely to support the gas generator, but may constitute an existing lateral seat support or a support for reinforcing the sidewall of the vehicle which is enclosed within the sidewall. As used herein, the "sidewall" will be understood to include the side door of the vehicle. This makes it unnecessary for any part of the side restraint of the invention to extend into the interior of the vehicle in the unactivated condition. The support may alternatively constitute the housing for the gas generator.

The invention allows for a variety of structural designs without impairing its effectiveness. Thus, in a sidewall, i.e., for example, a door, having a rigid inner wall member, it is possible to arrange an airbag so that, in the inflated state, it essentially fills up the space between the inner and outer wall members of the door, thereby forming a yielding reinforcement of the sidewall with a deformation path which is equal to the thickness of the sidewall. In contrast, if the sidewall were provided with a permanent foam filling, in case of deformation a residual thickness of the filling would remain.

On the other hand, it is also possible to provide a sidewall with a yielding inner wall member which, under the pressure of the inflated airbag, is deformed toward the interior of the vehicle so that the available deformation path is increased.

Although British Patent No. 1 441 598, for example, discloses a side restraint having a foam member and an inner wall which moves toward the passenger in case of a broadside collision, the deformation path provided by the foam member is limited to the original thickness of that member and the full thickness must be taken into account in the design of the interior of the vehicle in its normal condition. In contrast, the present invention provides a side restraint which assumes its transverse dimension, and hence the deformation path, only in the event of a broadside collision.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
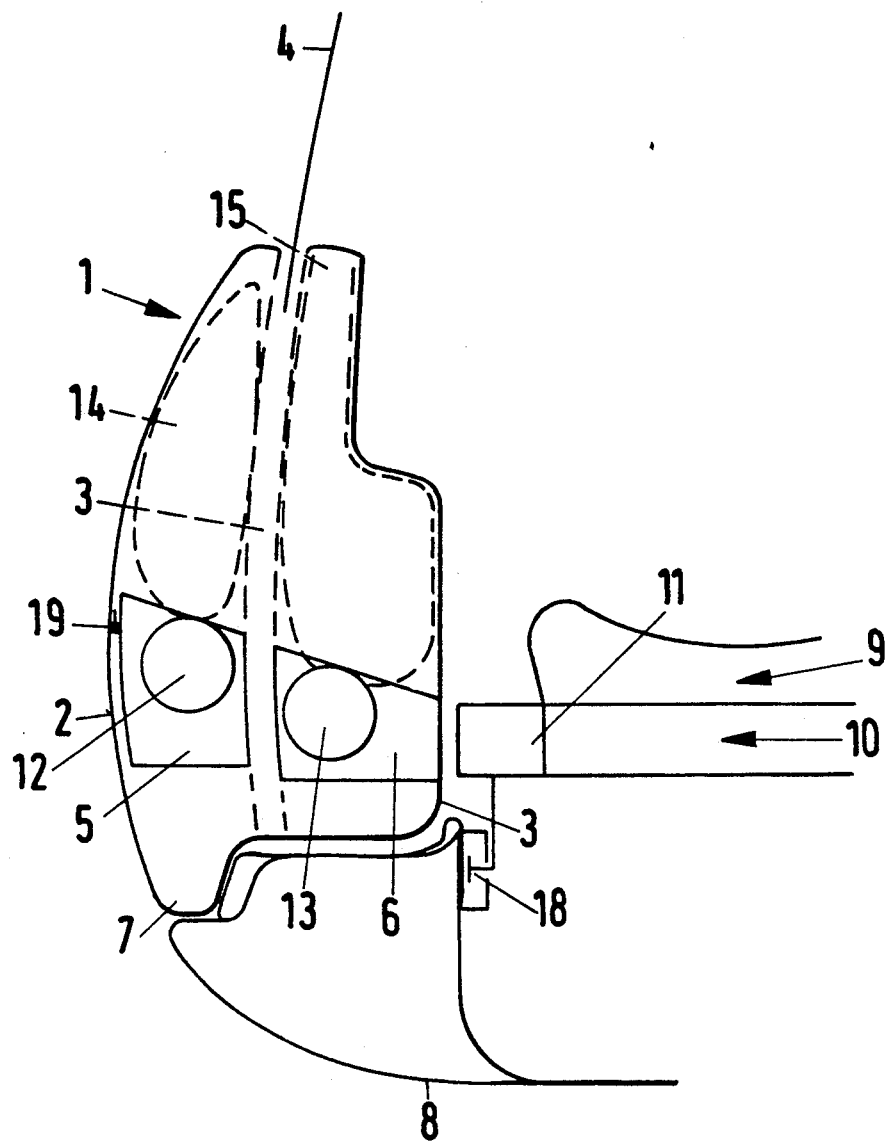
FIG. 1 is a sectional view through the sidewall of a passenger car illustrating a representative embodiment of the invention.

In the typical embodiment of the invention shown in FIG. 1, a door 1 for a motor vehicle has an outer wall 2 and an inner wall 3 enclosing a space with a slot 3a into which a side window 4 may be lowered, and two longitudinally extending door supports 5 and 6. The door has a depending projection 7 arranged to engage a longitudinal sill 8 in the body in case of a broadside collision.

Adjacent to the inside wall 3 of the door 1, there is a seat 9 having a frame 10 containing a longitudinally extending seat support 11. As shown in FIG. 1, the inside wall 3 is shaped to form an armrest for an occupant of the seat 9.

In one embodiment of the invention as shown in the drawings, two generators 12 and 13 for corresponding airbags 14 and 15 are mounted in the supports 5 and 6, respectively, on opposite sides of the window slot 3a. In FIG. 1 these airbags are illustrated in dash outline in their inflated condition. In this example it is assumed that the inner wall 3 of the door 1 is rigid, i.e., it is not deformed by the pressure of the inflated airbags 14 and 15. As a result, the airbags 14 and 15 when inflated essentially fill up the space between the inner and outer walls 2 and 3 and form a yielding reinforcement in the transverse direction.

Figure 3:
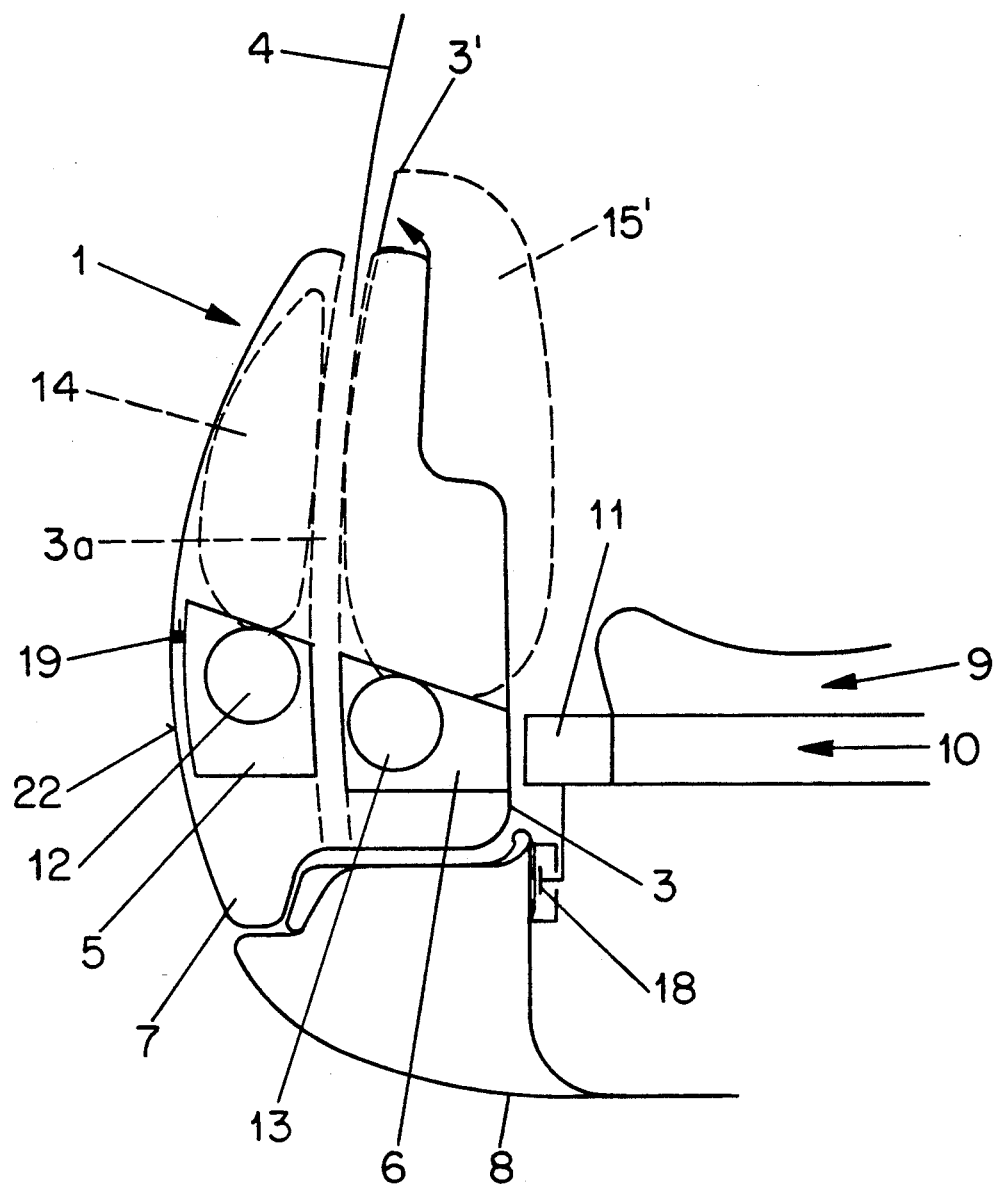
FIGS. 3 and 4 illustrate two further representative embodiments of the invention.

In a second embodiment, shown in FIG. 3, the inner wall 3 is designed to yield under the pressure of the airbags 14 and 15 in their inflated condition.

In this case, the inner airbag assumes the shape 15' shown in dash outline in the drawings, i.e., it extends slightly inwardly in the direction of the passenger. The inner wall 3 also includes a region 3' near the window sill which, under the pressure of the inflated airbag 15', swings upward adjacent to the edge of the window 4, which will normally be broken by the impact, and protects the airbag 15' from destruction. Expansion of the airbag up over the window sill in this manner provides additional protection for the passenger's head, since the lower part of the passenger's body is supported.

Figure 4:
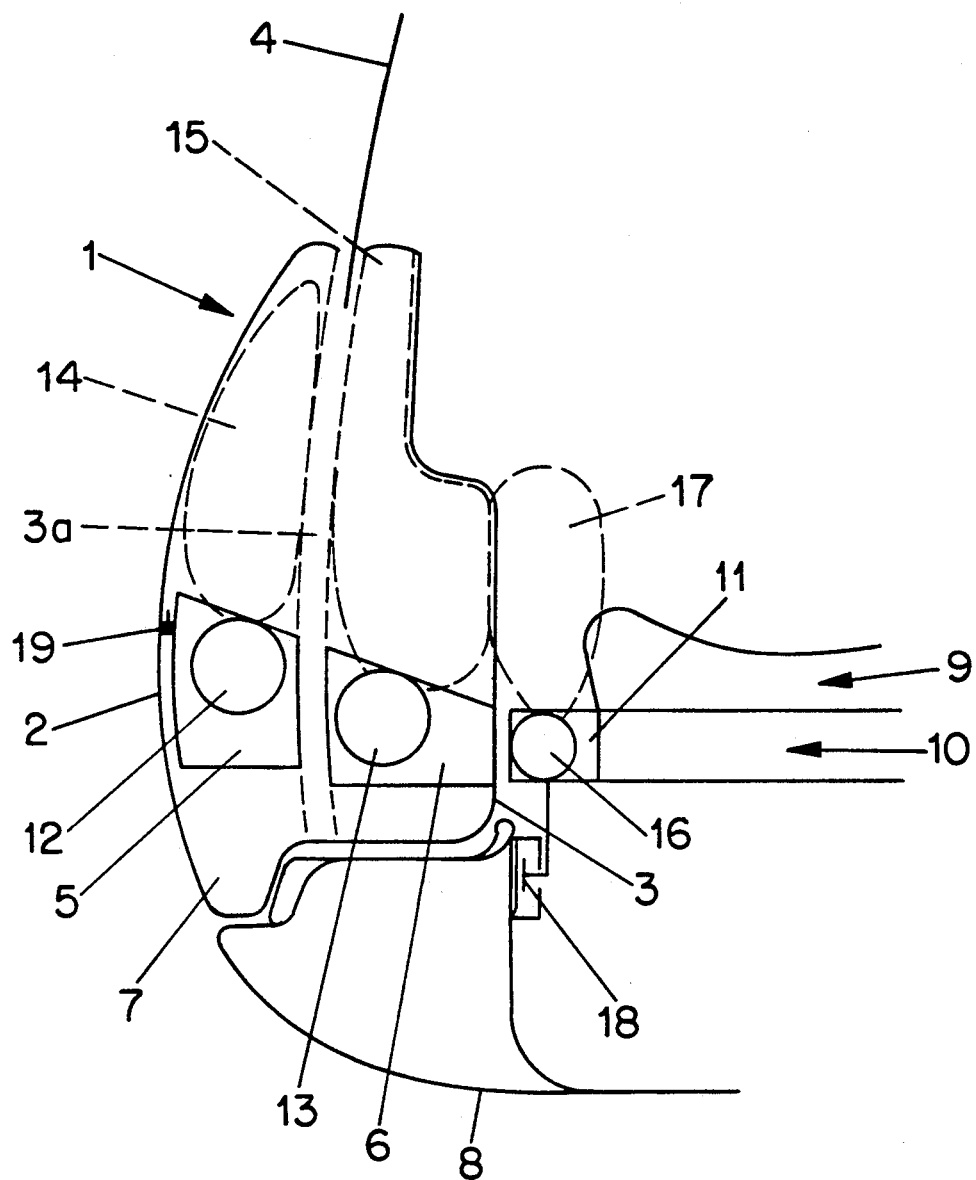

A third embodiment of the invention shown in FIG. 4 provides a gas generator 16 and an associated airbag 17 mounted in the seat support 11. As shown in FIG. 4, the gas generator casing 16 may also constitute a support member for the seat. In the inflated condition shown in the drawing, the airbag 17 extends between the seat 9 and the inner wall 3 of the door 1. In this case as in the others, the airbag, prior to inflation, is located in the immediate vicinity of the region into which it extends in the inflated condition, i.e., near the passenger's pelvic and, possibly, shoulder region.

The construction of the side restraint in this manner does not compromise the remaining vehicle design since the seat frame 10 may be mounted in the usual way on a longitudinally displaceable support 18 in the vehicle body.

Figure 2:
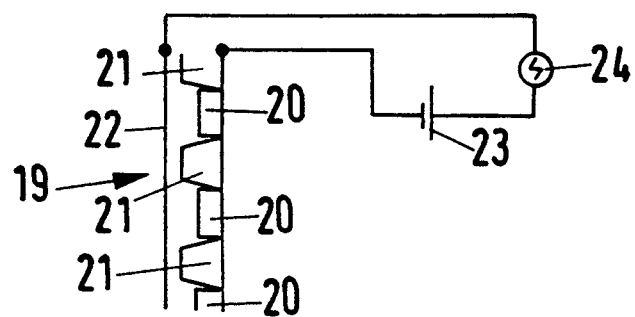
FIG. 2 is a schematic cross-sectional view illustrating a representative contact arrangement for actuating the passenger restraint according to the invention.

Actuation of the gas generators 12, 13 and 16 may take place in a conventional manner by providing a contact strip 19 on or beneath the outer wall 2. The arrangement of the contact strip 19 and its actuating circuit are shown in FIG. 2. In this arrangement, a series of contacts 20 are separated by intervening rubber buffers 21. The rubber buffers extend above the contacts so that a slight deformation of the outer wall 2 will not permit the wall to engage between the contacts 20 and a countercontact 22, thereby preventing a circuit containing a battery 23 and an ignition device 24 from being closed. When a broadside collision occurs, however, the wall 2 depresses the buffers 21 sufficiently to engage the contacts 20 and 22 and activate the ignition device 24 for a gas reservoir.

In a variation of the described embodiments, the airbag 15 may be designed to emerge when inflated from the sidewall 3 into the space between the seat 9 and the sidewall. Alternatively, the airbag may be accommodated in an armrest of the seat in the unactivated state.

Accordingly, the invention provides a side restraint which, at least in its unactivated state, requires practically no additional room and when activated responds very quickly.

Although the invention has been described herein with reference to specific embodiments, many modifications and variations therein will readily occur to those skilled in the art. Accordingly, all such variations and modifications are included within the intended scope of the invention.

I claim:

1. An airbag-equipped side restraint for a motor vehicle passenger comprising support means extending longitudinally in or adjacent to a sidewall of the vehicle and positioned adjacent to and not higher than the horizontal plane of the seating surface of the passenger seat in the vehicle, gas generator means associated with the support means, collision sensor means for activating the gas generator means, and airbag means arranged to expand upwardly from the support means when inflated by gas from the gas generator means, wherein the support means comprises a seat support extending adjacent to the sidewall.

2. A side restraint according to claim 1 wherein the airbag means, when inflated, expands laterally from a seat armrest.

3. An airbag-equipped side restraint for a motor vehicle passenger comprising support means extending longitudinally in or adjacent to a sidewall of the vehicle and positioned adjacent to and not higher than the horizontal plane of the seating surface of a passenger seat in the vehicle, gas generator means associated with the support means, collision sensor means for activating the gas generator means, and airbag means arranged to expand upwardly from the support means when inflated by gas from the gas generator means, wherein the support means and the airbag means are mounted in the sidewall, and wherein the sidewall has inner and outer wall members and wherein the airbag means, in the inflated condition, substantially fills the space between the inner and outer wall members.

4. An airbag-equipped side restraint for a motor vehicle passenger comprising support means extending longitudinally in or adjacent to a sidewall of the vehicle and positioned adjacent to and not higher than the horizontal plane of the seating surface of a passenger seat in the vehicle, gas generator means associated with the support means, collision sensor means for activating the gas generator means, and airbag means arranged to expand upwardly from the support means when inflated by gas from the gas generator means, wherein the support means and the airbag means are mounted in the sidewall, and wherein the sidewall has a window slot and the airbag means includes an airbag on each side of the window slot.

5. A side restraint according to claim 4 wherein the support means includes supports extending longitudinally on each side of the window slot beneath the airbags.

6. A side restraint according to any one of claims 1, 3 and 4 wherein the support means includes a hollow support member and the gas generator means includes a gas generator in the hollow support member.

7. A side restraint according to claim 6 wherein the support means comprises the housing for the gas generator.

* * * * *